United States Patent [19]
Goto

[11] Patent Number: 5,748,801
[45] Date of Patent: May 5, 1998

[54] METHOD OF SETTING THRESHOLD VALUES FOR EXTRACTING IMAGE DATA

[75] Inventor: Yoshihiro Goto, Tokyo, Japan

[73] Assignee: Hitachi Medical Corporation, Tokyo, Japan

[21] Appl. No.: 767,284

[22] Filed: Dec. 16, 1996

Related U.S. Application Data

[63] Continuation of Ser. No. 231,475, Apr. 22, 1994, abandoned.

[30] Foreign Application Priority Data

Apr. 22, 1993 [JP] Japan ..................... 5-117625

[51] Int. Cl.$^6$ .......................................... G06K 9/38
[52] U.S. Cl. .......................... 382/270; 382/282
[58] Field of Search ...................... 382/270, 282, 382/128, 132, 173; 358/465, 466

[56] References Cited

U.S. PATENT DOCUMENTS

| | | | |
|---|---|---|---|
| 4,950,894 | 8/1990 | Hara et al. | 382/172 |
| 5,068,788 | 11/1991 | Goodenough et al. | 382/172 |
| 5,138,671 | 8/1992 | Yokoyama | 382/172 |
| 5,319,547 | 6/1994 | Krug et al. | 382/199 |
| 5,345,513 | 9/1994 | Takeda et al. | 382/172 |

FOREIGN PATENT DOCUMENTS 3-167677  7/1991  Japan .

*Primary Examiner*—Yon J. Couso
*Attorney, Agent, or Firm*—Antonelli, Terry, Stout, & Kraus, LLP

[57] ABSTRACT

A method of setting threshold values for extracting image data includes the steps of determining (a) that a pixel of an image to be extracted is to be displayed in color if (1) a density value of the pixel is between a first threshold value and a second threshold value, and (2) a density gradient of the pixel is between a third threshold value and a fourth threshold value, and (b) that the pixel is to be displayed in monochrome if (1) the density value of the pixel is not between the first threshold value and the second threshold value, or (2) the density gradient of the pixel is not between the third threshold value and the fourth threshold value, and changing at least one of the first threshold value and the second threshold value to enable a desired image region of the image to be extracted to be displayed in color.

6 Claims, 6 Drawing Sheets

METHOD OF SETTING THRESHOLD VALUES FOR EXTRACTING IMAGE DATA

CROSS-REFERENCE TO RELATED APPLICATION

This is a continuation of application Ser. No. 08/231,475 filed on Apr. 22, 1994, now abandoned.

BACKGROUND OF THE INVENTION

This invention relates to methods of setting threshold values for pixel values of an image when a particular region such as bones or internal organs of a body to be examined is extracted from a CT image which was produced by examining the body with an image diagnosis apparatus such as an X-ray CT scanner or an MRI apparatus, and particularly to a method of setting threshold values for extracting image data in which the set threshold values can be decided to be proper or not in real time.

In a conventional threshold value setting method of this kind, a histogram of an image is produced and displayed on an image diagnosis apparatus, and a particular region of a bone, an organ or the like is discriminated from other regions while viewing the pattern of the histogram. Then, threshold values for the particular region are inputted through a keyboard of an input unit and used to extract an image. The extracted image is displayed so that it can be confirmed whether the threshold values are correct or not.

In this prior art, however, the operations for setting the threshold values and displaying the image extracted on the basis of the threshold values are not performed in real time. The operator decides whether the threshold values are correct or not while viewing the displayed image. If the threshold values have not been correctly set, the image is stopped from being displayed, and different threshold values are again inputted through the keyboard and processed in order for an image of the particular region to be extracted. Then, the extracted image is required to be again displayed for the operator's decision. In other words, the threshold values must be set after repeated trial and error in the image extracting operation and displaying operation. Accordingly, it is troublesome to input threshold values through the keyboard, and the image must also be displayed in order for the operator to see if it is correct or not. Therefore, it takes a long time to finally obtain the proper threshold values. Particularly in, for example, a tomographic image of a human head, if the brain is to be discriminated from the skin and extracted from the image, it is necessary to use two kinds of threshold values for the discrimination because the skin and the brain have almost the same density value. In this case also, the keyboard operation is troublesome, and much time is taken to obtain the final result. An example of the prior art is described in Japanese Patent Laid-open Gazette No. 3-167677.

SUMMARY OF THE INVENTION

Accordingly, it is an object of the invention to provide a method of setting threshold values for extraction of an image which enables an operator to decide whether the set threshold values are correct or not in real time.

The method of setting threshold values of this invention which can achieve the above object includes a first step of determining whether an extracted image is to be displayed selectively in monochrome or in color by comparing a density gradient of pixels in the extracted image with third and fourth variable threshold values while the extracted image is being displayed in real time, and a second step of gradually selecting an image region of the extracted image to be displayed in color by comparing a density value of pixels in the extracted image with first and second variable threshold values while the first and second threshold values are being changed.

The fundamental portion of this invention is the second step, and specifically it includes the following steps. Hereinafter, it will be referred to as a first threshold setting method.

(A) A step of setting upper and lower limits defining a window of density values to be displayed;

(B) A step of providing in memory a table having density values as addresses and brightness values as data in order to display in color pixels having density values in a range within the window set by first and second threshold values, and to display in monochrome pixels having density values outside the range; and (C) A step of optimizing the first and second threshold values by changing the first and second threshold values through an input unit while an image of interest is being displayed by use of the above table so that an image region to be extracted can be displayed in color.

In practice, there are different tissues with almost the same density in a CT image, such as skin and brain, for instance. In this case, the brain and the skin will both be displayed in color under the first threshold setting method. Thus, the first step referred to above is executed to distinguish between the different tissues having the same density by calculating a density gradient between a pixel of interest and one or more pixels surrounding the pixel of interest. In other words, since air surrounds the skin, the density difference or gradient between a pixel of skin and a pixel of air is large. However, the density difference between pixels of brain is very small. Thus, if an image to be extracted is selected by selecting pixels for which the density difference or gradient between the selected pixels and the surrounding pixels is less than a certain value, the skin image can be eliminated from the image to be extracted. An image region other than the image to be extracted is displayed in monochrome and the image to be extracted is displayed in color by determining threshold values according to the first threshold setting method.

In this case, it is thus necessary to set third and fourth threshold values for selecting an image according to the density gradient.

The second threshold setting method of the invention which considers the density gradient includes the following steps.

(1) A step for setting upper and lower limits of the density window to be displayed and a center level of the window;

(2) A step for providing in memory a first table having density values as addresses and brightness values as data in order to display the window in monochrome;

(3) A step for providing in memory a second table having density values as addresses and brightness values as data in order to display in color pixels having density values in a certain range set by first and second threshold values within the window and to display in monochrome pixels having density values outside the certain range within the window;

(4) A third step for providing in memory a third table having density gradients as addresses, and addresses for specifying the first and second tables to be used to display the image as data, this third table having stored the address specifying the first or second table at the addresses in a range set by third and fourth threshold values;

(5) A step for finding a density gradient of a selected pixel by using the density value of the selected pixel and the density value of one or more pixels surrounding the selected pixel;

(6) A step for selecting one of the first and second tables to be used to display the image from the third table at the address of the density gradient of the selected pixel and displaying the selected pixel using the selected table; and (7) A step for setting the first and second threshold values in order to display in color the image region to be extracted by changing the first and second threshold values through an input unit when the second table is selected.

In this case, in order that whether or not the selected pixel is the pixel to be extracted is decided on the basis of the density gradient, it is also possible to compare the density gradient with the variable third and fourth threshold values according to a program and display the image by use of the first table or second table depending on the result. If the above mentioned third table is used, the processing speed of this function can be increased.

According to this invention, since it is decided whether to display the image region to be extracted in color by supplying arbitrary threshold values through an input unit while the image of interest is being displayed, an operator can decide whether the set threshold values are proper or not in real time. Therefore, according to this invention, the operation for determining proper threshold values is simpler and takes less time.

DESCRIPTION OF THE PREFERRED EMBODIMENTS

An embodiment of the present invention will be described in detail with reference to the accompanying drawings.

Figure 1:
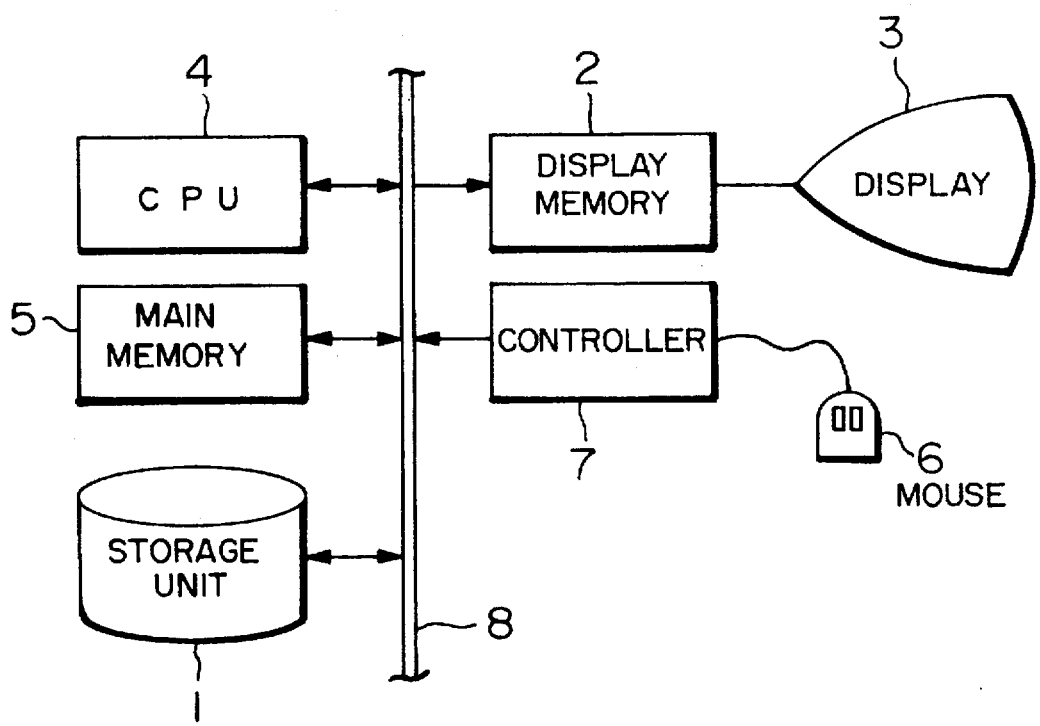
FIG. 1 is a block diagram showing the construction of an image processor which is used to execute the method of setting threshold values according to this invention.

FIG. 1 is a block diagram showing the construction of an image processor for use in an embodiment of a method of setting threshold values according to this invention. Referring to FIG. 1, there is shown a storage unit 1 which is used to store a large number of CT images of parts of a body that have been detected and produced on an external apparatus, for example, an X-ray CT scanner. This storage unit 1 includes a magnetic tape, a magnetic disk or the like. A display memory 2 stores image data of a CT image read from the storage unit 1. A display 3 reads the image data from the display memory 2 and displays the CT image on its screen. The display 3 includes a color CRT. A CPU 4 is a central processing unit for controlling the whole image processor. A main memory 5 stores data and information necessary for the controlling operation of the CPU 4. The CPU 4 directly specifies an address. A mouse 6 is an input unit through which data and information are fed from the outside under the control of a controller 7. In addition, a data bus 8 is shown in FIG. 1.

The threshold setting method using the image processor having the above-mentioned construction will be described with reference to FIGS. 2 through 4. This threshold setting method is executed to determine threshold values for pixels of an image which is to be extracted when a particular region of, for example, a bone or an internal organ is extracted from a CT image of part of a body detected by an image diagnosis apparatus such as an X-ray CT scanner or an MRI apparatus. That is, this threshold setting method utilizes a first conversion table 9 shown in FIG. 2, a second conversion table 10 shown in FIG. 3 and a third conversion table 11 shown in FIG. 4. At this time, a color table for use in the display 3 which includes a color CRT shown in FIG. 1 is of, for example, 8 bits and displays brightness values 0 through Bmax of a luminance signal in monochrome and brightness values (Bmax+1) through 255 of the luminance signal in color.

Figure 2:
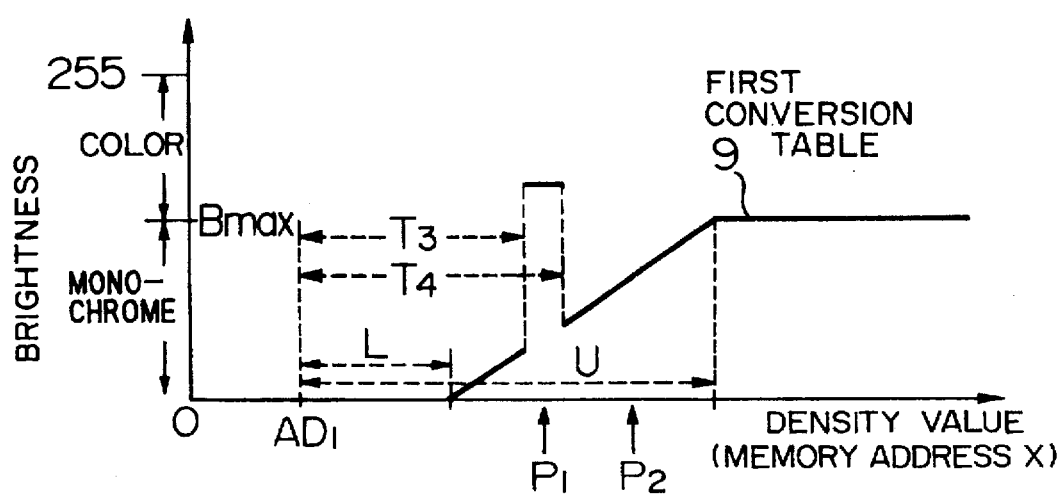
FIG. 2 is a graph showing the input to and output from a first conversion table.

The first conversion table 9 shown in FIG. 2 is used for real time display of specified pixels at corresponding brightnesses. This table is formed in memory so as to have density values of pixels as addresses and brightness values as data. In order to produce this conversion table 9 in memory, it is first necessary to establish a window of (U-L), where U and L are an upper limit and a lower limit of density values to be displayed, and a center of the window is (U+L)/2. The brightness value corresponding to the upper limit U is Bmax and the brightness value corresponding to the lower limit L is zero.

Then, the mouse 6 shown in FIG. 1 is used to set threshold values T3 and T4 within the window to define a range of density values for which are stored brightness values which the display 3 displays in color. In other words, some of the brightness values (Bmax+1) through 255 are stored between the threshold values T3 and T4. The conversion table 9 of FIG. 2 shows that a pixel of density value P1 is displayed in color and that a pixel of density value P2 is displayed in monochrome.

Figure 3:
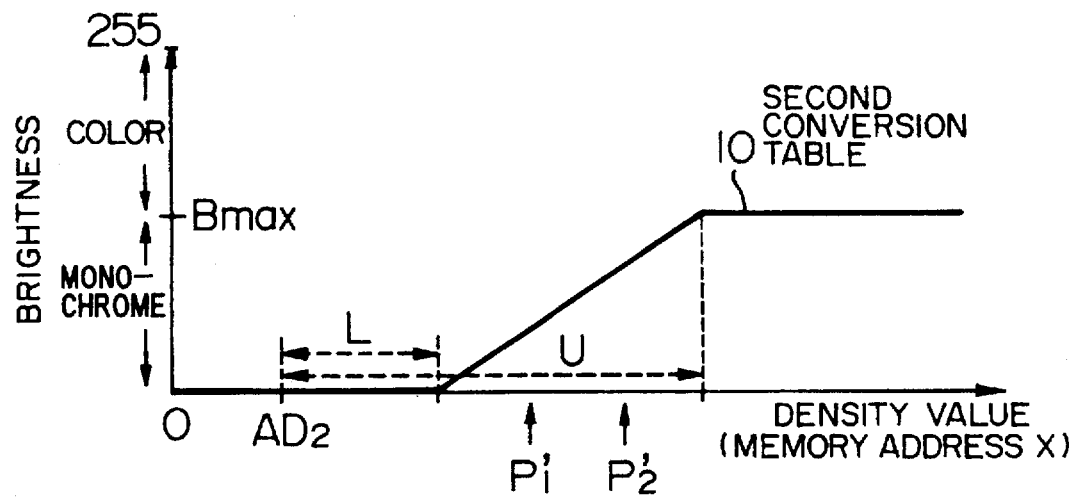
FIG. 3 is a graph showing the input to and output from a second conversion table.

The second conversion table 10 shown in FIG. 3 is produced in the same manner as the first conversion table 9. However, a range of density values for which are stored brightness values which the display 3 displays in color is not provided within the window. The conversion table 10 of FIG. 3 shows that pixels of density values P1' and P2' are displayed in monochrome.

Figure 4:
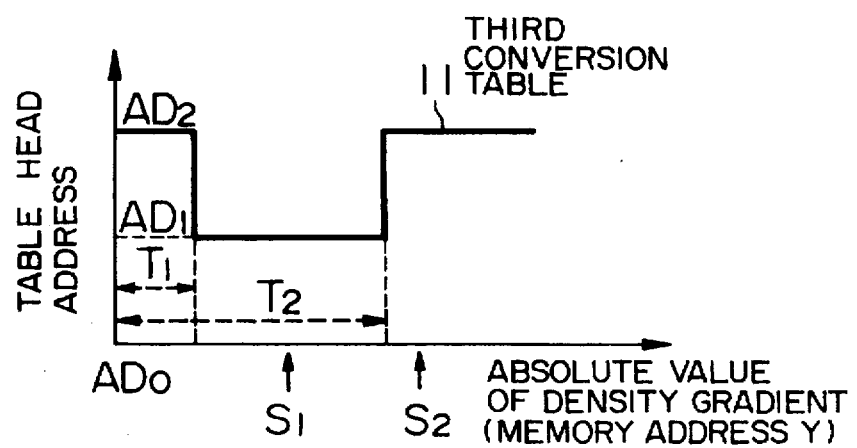
FIG. 4 is a graph showing the input to and output from a third conversion table.

The third conversion table 11 shown in FIG. 4 is a table for selecting one of the first and second conversion tables 9 and 10 according to the magnitude of a density gradient in order to distinguish different regions with the same density from one another such that only a desired region is displayed in color as described in the summary of the invention.

In the third conversion table 11, the address is the absolute value of a density gradient between the density of a specified pixel and the density of one or more pixels around the specified pixel, and the data is the head address of a conversion table to be used in image display. The head address of the third conversion table 11 in memory is AD0. In other words, the head address AD2 in memory of the second conversion table 10 is stored at addresses between AD0 and (AD0+T1) and at addresses from (AD0+T2) on, and the head address AD1 in memory of the first conversion table 9 is stored at addresses between (AD0+T1+1) and (AD0+T2−1). Thus, as shown in FIG. 4, when an absolute value S1 of density gradient is between the threshold values T1 and T2, the head address AD1 is output and the first conversion table 9 of FIG. 2 is selected for image display. On the other hand, when an absolute value S2 of density gradient is not between the threshold values T1 and T2, the head address AD2 is output and the second conversion table 10 of FIG. 3 is selected for image display.

There are different tissues with substantially the same density, for example, skin and brain, in a CT image. When only the brain region is desired to be extracted, it is necessary to distinguish the skin from the brain. In this case, the different tissues having the same density are distinguished from one another by calculating the density gradient of the pixels that are desired to be extracted by using the density values of one or more neighboring pixels. In other words, since air surrounds the skin, the density difference or gradient between skin pixels and air pixels is large. However, the density difference or gradient between brain pixels is very small. Thus, when only the brain region is desired to be extracted, the threshold values T1 and T2 are set so that the density gradient between pixels in the brain region falls between the threshold values T1 and T2. Then, an image of the brain region can be displayed in color using the first conversion table 9, and under this condition the threshold values T3 and T4 of the first conversion table 9 can be changed to optimum values in order for a desired image region to be displayed in color.

An image of the skin region is displayed in monochrome using the second conversion table 10 since the density gradient between pixels in the skin region and pixels in the air region is too large to fall between the threshold values T1 and T2.

Since an image to be extracted is displayed in monochrome until the threshold values are set correctly, an operator can perceive that an image of interest cannot be extracted at the set threshold values, and thus can immediately change the threshold values until proper threshold values are obtained.

If the table of FIG. 4 is modified to be symmetrical on the left and right sides of the address AD0 located at the origin, the actual value of the density gradient can be used instead of its absolute value.

Figure 5:
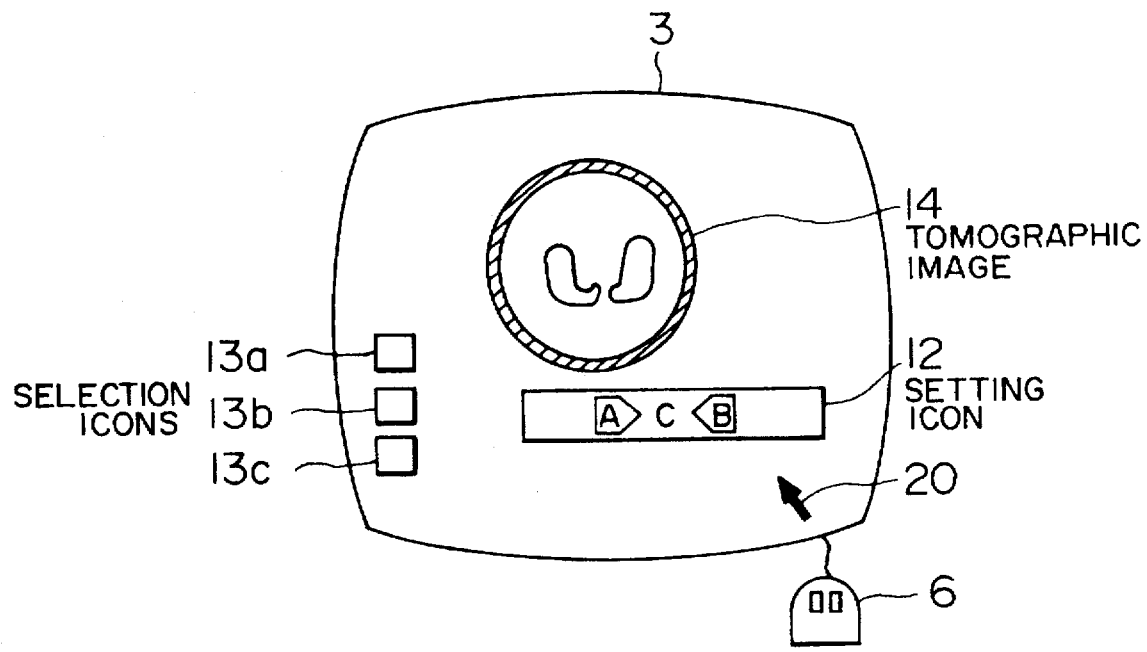
FIG. 5 shows an example of displayed images to which reference is made in explaining an embodiment of the method of setting threshold values according to this invention.

With reference to FIGS. 5 through 9, a description will be made of the embodiment of the threshold setting method of the invention using the image processor shown in FIG. 1. In this embodiment, the threshold values are set by the mouse 6 while the image is being displayed on the display 3. As illustrated in FIG. 5, a tomographic image 14 of, for example, a head is displayed on the screen of the display 3. In addition, there are also displayed an icon 12 for setting threshold values (T1, T2, T3, T4), an icon 13a for selecting the setting of T3 and T4, an icon 13b for selecting the setting of T1 and T2 and an icon 13c for selecting the end of processing. At this time, the threshold setting icon 12 is divided into three different regions A, B and C. For example, when the first selection icon 13a is turned on and then the mouse 6 is clicked to interlock with the region A as indicated by a cursor arrow 20, the threshold value T3 is changed. When it is interlocked with the region B, the threshold value T4 is changed. When it is interlocked with the region C, the threshold values T3 and T4 are equally changed in the same direction. Similarly when the second selection icon 13b is turned on and then the mouse 6 is clicked to interlock with the region A as indicated by the cursor arrow 20, the threshold value T1 is changed. When it is interlocked with the region B, the threshold value T2 is changed. When it is interlocked with the region C, the threshold values T1 and T2 are equally changed in the same direction.

First, the mouse 6 shown in FIG. 5 is clicked to turn on the first selection icon 13a on the screen of the display 3. At this time, the on-state of the icon 13a is detected at step A of the flowchart of FIG. 7 and as a result the program proceeds to the "YES" side. Thus, the setting icon 12 is displayed on the display 3 as shown in FIG. 5 and the flowchart skips to step D. The program waits at step D until the mouse 6 is clicked. When it is clicked, the program advances to the "YES" side. Then at the following steps E, F, G and H it is decided whether the mouse 6 is interlocked with the region A, B or C of the setting icon 12 or with another region based on the location of the cursor arrow 20. If it is interlocked with the region A, the step E proceeds to the "YES" side, entering into step I. The threshold value T3 shown in FIG. 2 is changed (step I). Under this condition the image is displayed (step L). If it is interlocked with the region B, the step F advances to the "YES" side, entering into step J. The threshold value T4 shown in FIG. 2 is changed (step J). Under this condition the image is displayed (step L). If it is interlocked with the region C, the step G advances to the "YES" side, entering into step K. The threshold values T3 and T4 are equally changed in the same direction (step K). Under this condition, the image is displayed (step L). At this time, when the image is displayed at the step L, it is decided whether the threshold values T3 and T4 at that condition are appropriate or not. If the mouse is not interlocked with the region A, B or C, the step H advances to the "YES" side and goes back to step A.

Then the mouse 6 shown in FIG. 5 is clicked to turn on the second selection icon 13b on the display 3. At this time, the on-state of the icon 13b is detected at step B of the flowchart of FIG. 7 and the program advances to the "YES" side of step B and through a node ① to step M of another flowchart shown in FIG. 8. At step M, the program waits until the mouse 6 is clicked. If it is clicked, step M proceeds to the "YES" side. At the following steps N, O, P and Q it is decided whether the mouse is interlocked with the region A, B or C or with another region based on the location of the cursor arrow 20. Then the program advances in the same procedure as in the flowchart of FIG. 7 and arbitrarily changes the threshold values T1 and T2 shown in FIG. 4, thus setting proper threshold values. At this time it is decided whether the threshold values at each condition are appropriate or not.

Figure 7:
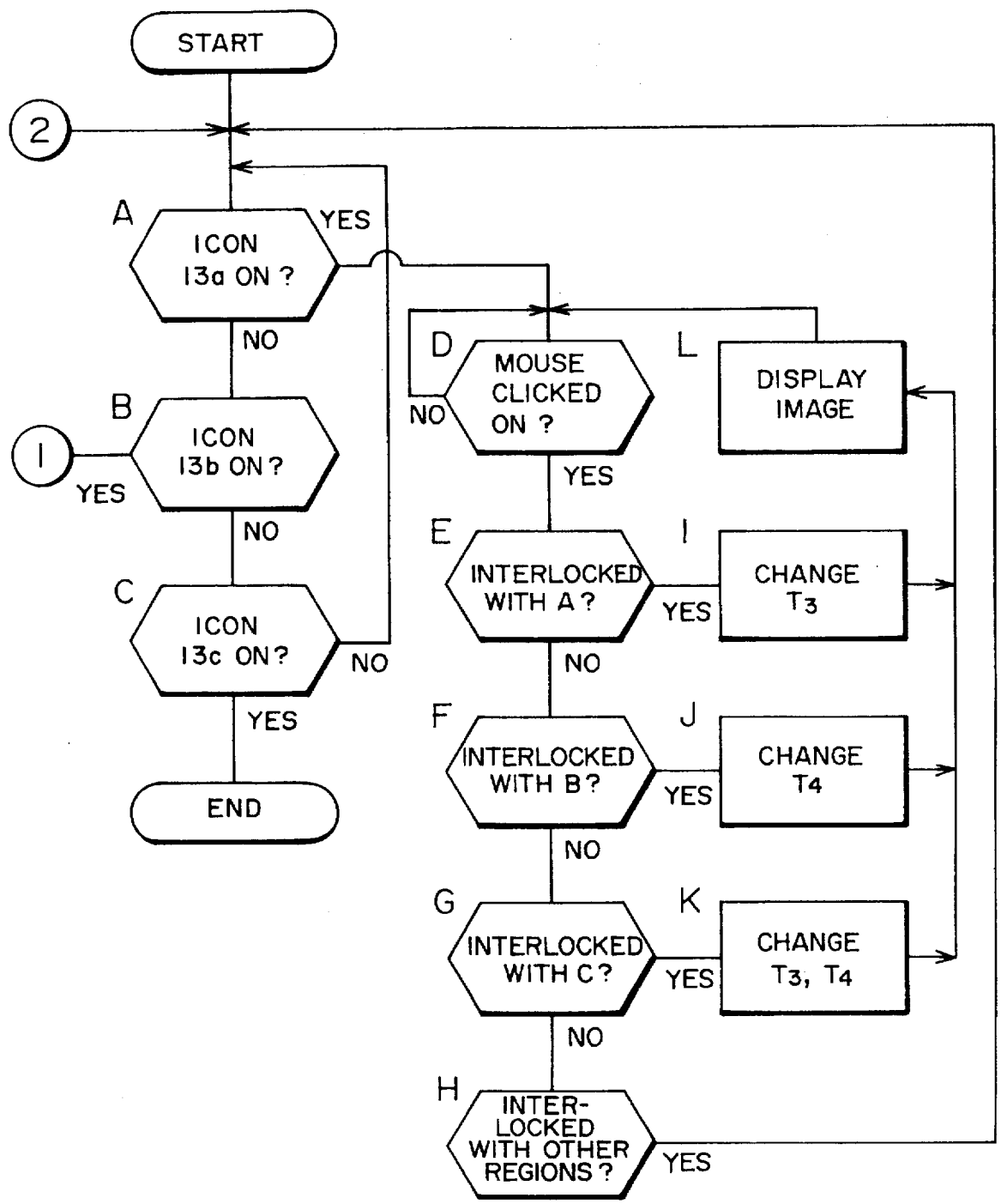
FIG. 7 shows the first half of a flowchart for the embodiment of FIG. 5.
Figure 8:
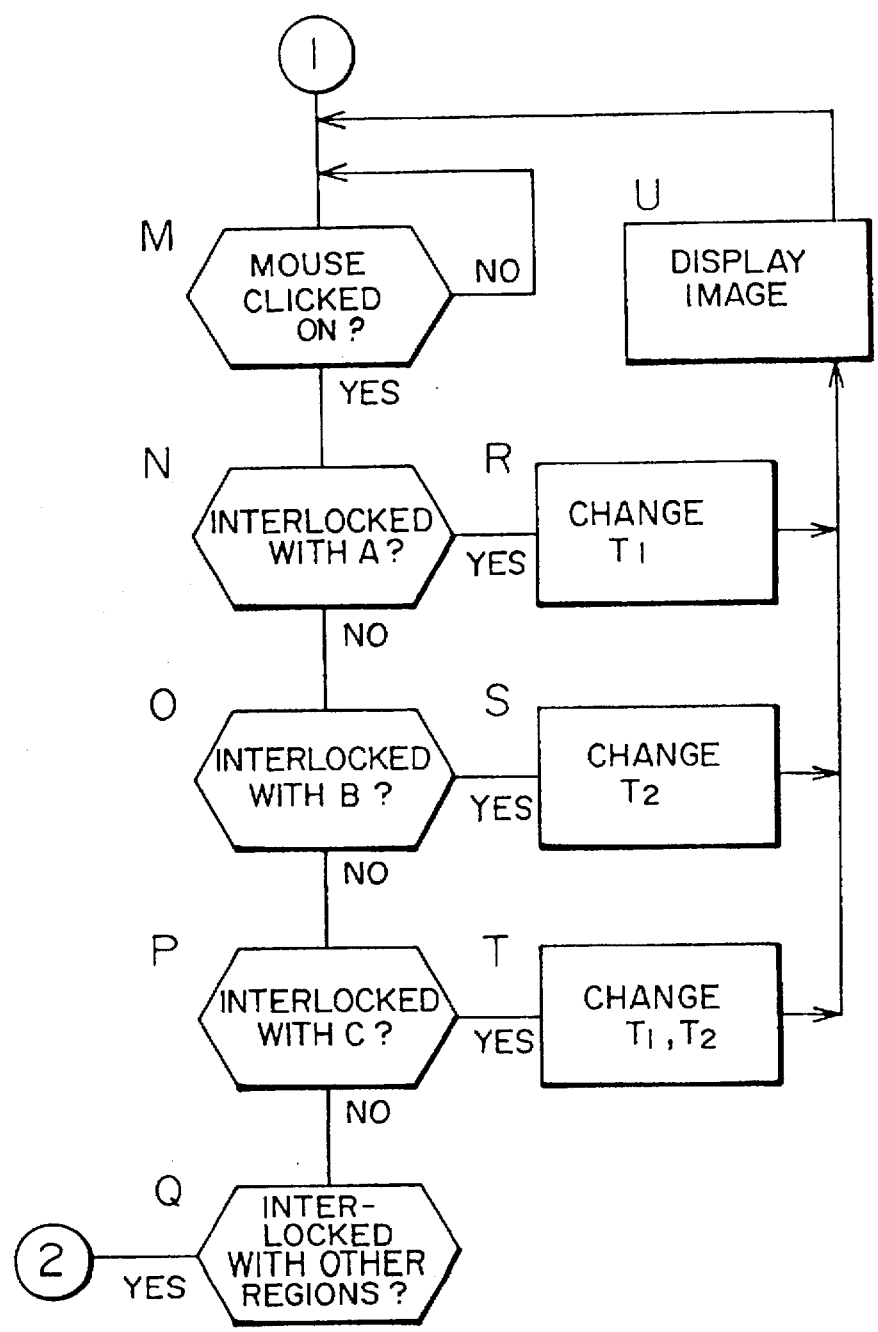
FIG. 8 shows the second half of the flowchart for the embodiment of FIG. 5.

When the step Q proceeds to the "YES" side, the process is returned through a node ① to the step A of the flowchart of FIG. 7. Under this condition, when the threshold values T1, T2, T3 and T4 have been completely inputted, the operator clicks the mouse to turn on the third selection icon 13c. Thus the step C advances to the "YES" side and the program ends, completing the setting of the desired threshold values.

Figure 6:
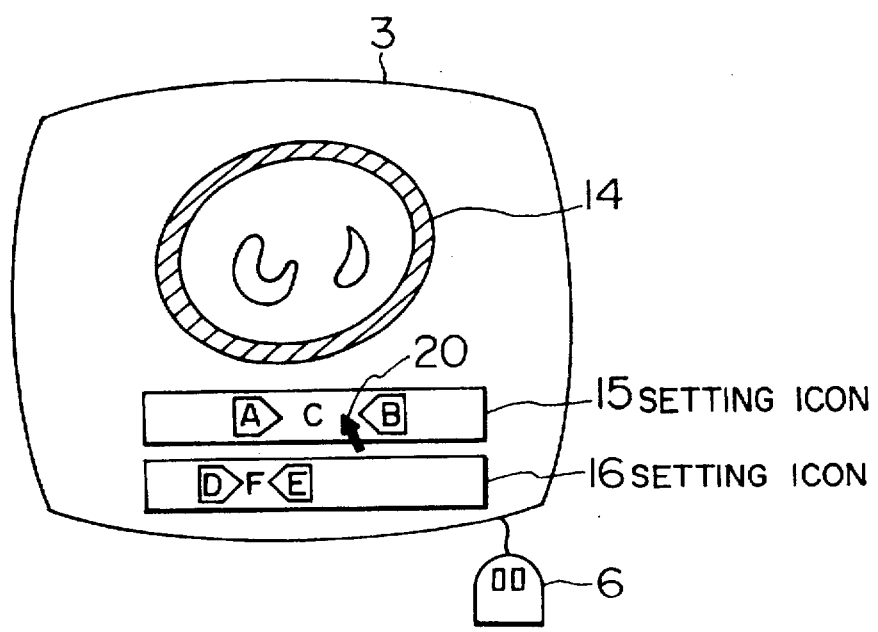
FIG. 6 is another example of displayed images to which reference is made in explaining another embodiment of the invention.
Figure 9:
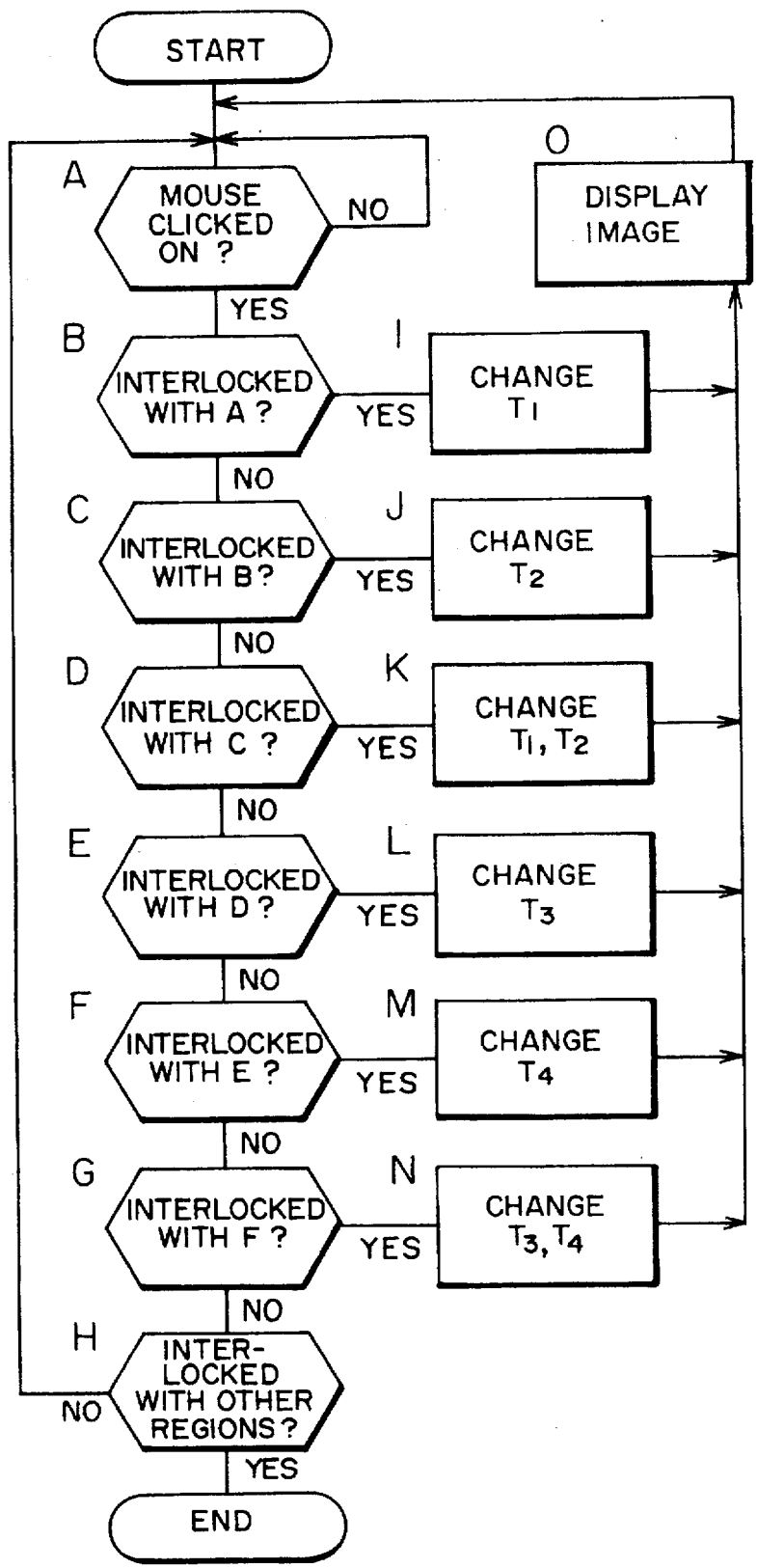
FIG. 9 is a flowchart for the embodiment of FIG. 6.

FIGS. 6 and 9 show another embodiment of the threshold setting method of the invention. First, as illustrated in FIG. 6, a tomographic image 14 of, for example, a head is displayed on the screen of the display 3 and a setting icon 15 for setting the threshold values T1 and T2 shown in FIG. 4 and a setting icon 16 for setting the threshold values T3 and T4 shown in FIG. 2 are also displayed on the screen. At this time, the first threshold setting icon 15 is divided into three regions A, B and C. When the mouse 6 is clicked to interlock with the region A, the threshold value T1 is changed. If it is clicked to interlock with the region B, the threshold value T2 is changed. If it is clicked to interlock with the region C, the threshold values T1 and T2 are equally changed in the same direction. Similarly, the second threshold setting icon 16 is divided into three regions D, E and F. If the mouse 6 is clicked to interlock with the region D, the threshold value T3 is changed. If it is clicked to interlock with the region E, the threshold value T4 is changed. If it is clicked to interlock with the region F, the threshold values T3 and T4 are equally changed in the same direction.

First, the mouse 6 shown in FIG. 6 is operated to turn on any one of the regions of the first threshold setting icon 15 or the second threshold setting icon 16. When the mouse 6 is clicked, the step A of the flowchart shown in FIG. 9 advances to the "YES" side. Then, at the following steps B, C, D, E, F, G and H, it is decided whether the mouse 6 is interlocked with the region A, B, C, D, E, F of the two threshold setting icons 15, 16 or with other regions based on the location of the cursor arrow 20. If the cursor is clicked at the region A, the step B advances to the "YES" side, entering into step I. The threshold value T1 shown in FIG. 4 is changed (step I). Under this condition, the image is displayed (step O). If it is clicked at the region B, the step C proceeds to the "YES" side, entering into step J. The threshold value T2 shown in FIG. 4 is changed (step J). Under this condition, the image is displayed (step O). If it is clicked at the region C, the step D advances to the "YES" side, entering into step K. The threshold values T1 and T2 shown in FIG. 4 are equally changed in the same direction (step K). Under this condition, the image is displayed (step O).

Similarly, if it is clicked at the region D, E or F, the step E, F or G advances to the "YES" side, entering into step L, M or N where the threshold value(s) T3, T4 or both T3 and T4 shown in FIG. 2 is/are changed. Under this condition, the image is displayed (step O). The user decides whether the threshold values are appropriate or not when the image is displayed. If the input operation for the threshold values T1, T2, T3 and T4 is finished, the user does not click the mouse 6 to interlock with any one of the regions of the first and second threshold setting icons 15, 16, but causes the step H to advance to the "YES" side, completing the setting of desired threshold values.

While all of the first, second and third conversion tables 9, 10 and 11 shown in FIGS. 2, 3 and 4 are used in the above description, only the first conversion table 9 shown in FIG. 2 may be used to set proper threshold values for displaying a desired image region in color in accordance with the flowchart of FIG. 7 when a particular region to be extracted, for example, a bone, is easily distinguished from other regions.

In addition, the third conversion table 11 shown in FIG. 4 may be replaced by the following conditional branch programs so that a density gradient n is directly compared with the threshold values T1 and T2 to obtain an output of the table head address AD1, AD2:

If $T1<n<T2$, then $AD=AD1$

If $n \leq T1$, then $AD=AD2$

If $T2 \leq n$, then $AD=AD2$

The data between the threshold values T1 and T2 can be freely selected to be AD1 or AD2 according to the situation.

I claim:

1. A method of setting threshold values for extracting a desired image region from image data having density values, the method comprising the steps of:

setting an upper limit of density values to be displayed in an image and a lower limit of density values to be displayed in the image, the upper limit and the lower limit thereby defining a window of density values to be displayed in the image, the window of density values being less than an entire range of the density values of the image data;

providing in memory a table having density values within the window of density values as addresses, brightness values to be displayed in color in the image as data for density values in a range of density values between a first threshold value and a second threshold value, and brightness values to be displayed in monochrome in the image as data for density values outside the range of density values between the first threshold value and the second threshold value;

extracting image data having density values falling within the window of density values from the image data;

displaying the extracted image data as an image using the table so that density values of the extracted image data in the range of density values between the first threshold value and the second threshold value are displayed as brightness values in color in the displayed image, and density values of the extracted image data outside the range of density values between the first threshold value and the second threshold value are displayed as brightness values in monochrome in the displayed image; and changing at least one of the first threshold value and the second threshold value while the displayed image is being displayed using the table until a desired image region of the displayed image is displayed in color.

2. A method of setting threshold values for extracting a desired image region from image data having density values, the method comprising the steps of:

setting a first threshold value defining a lower limit of density values of pixels to be displayed in color in an image and a second threshold value defining an upper limit of density values of pixels to be displayed in color in the image, the first threshold value and the second threshold value defining a range of density values of pixels corresponding to a desired object to be imaged;

setting a third threshold value defining a lower limit of density gradients of pixels to be displayed in color in the image and a fourth threshold value defining an upper limit of density gradients of pixels to be displayed in color in the image, the third threshold value and the fourth threshold value defining a range of density gradients of pixels corresponding to the desired object to be imaged;

displaying the image data as an image formed by pixels such that (a) a pixel of the displayed image is displayed in color if (1) the density value of the pixel is between the first threshold value and the second threshold value, and (2) the density gradient of the pixel is between the third threshold value and the fourth threshold value, and such that (b) the pixel is displayed in monochrome if (1) the density value of the pixel is not between the first threshold value and the second threshold value, or (2) the density gradient of the pixel is not between the third threshold value and the fourth threshold value; and changing at least one of the first threshold value and the second threshold value while the displayed image is being displayed until a desired image region of the displayed image corresponding to the desired object to be imaged is displayed in color.

3. A method of setting threshold values for extracting image data comprising the steps of:

setting an upper limit of density values to be displayed and a lower limit of density values to be displayed, the upper limit and the lower limit thereby defining a window of density values to be displayed;

providing in memory a first table having density values within the window as addresses, brightness values to be displayed in color as data for density values in a range of density values between a first threshold value and a second threshold value, and brightness values to be displayed in monochrome as data for density values outside the range of density values;

providing in memory a second table having density values within the window as addresses, and brightness values as data, the brightness values including only brightness values to be displayed in monochrome;

determining a density gradient of a selected pixel of an image to be extracted, the density gradient being determined based on a density value of the selected pixel and a density value of at least one pixel surrounding the selected pixel;

comparing the density gradient of the selected pixel with a third threshold value and a fourth threshold value;

selecting one of the first table and the second table to be used in displaying the selected pixel based on a result of the comparing step;

displaying the selected pixel using the selected one of the first table and the second table; and changing at least one of the first threshold value and the second threshold value until a desired image region of the image to be extracted is displayed in color.

4. A method of setting threshold values for extracting image data comprising the steps of:

setting an upper limit of density values to be displayed and a lower limit of density values to be displayed, the upper limit and the lower limit thereby defining a window of density values to be displayed;

providing in memory a first table having density values within the window as addresses, brightness values to be displayed in color as data for density values in a range of density values between a first threshold value and a second threshold value, and brightness values to be displayed in monochrome as data for density values outside the range of density values;

providing in memory a second table having density values within the window as addresses, and brightness values as data, the brightness values including only brightness values to be displayed in monochrome;

providing in memory a third table having density gradients as addresses, an address specifying one of the first table and the second table as data for density gradients between a third threshold value and a fourth threshold value, and an address specifying a remaining one of the first table and the second table as data for density gradients not between the third threshold value and the fourth threshold value;

determining a density gradient of a selected pixel of an image to be extracted, the density gradient being determined based on a density value of the selected pixel and a density value of at least one pixel surrounding the selected pixel;

selecting one of the first table and the second table to be used in displaying the selected pixel using the density gradient of the selected pixel and the third table;

displaying the selected pixel using the selected one of the first table and the second table; and changing at least one of the first threshold value and the second threshold value until a desired image region of the image to be extracted is displayed in color.

5. A method of setting threshold values for extracting a desired image region from image data, the image data including pixels having density values, the method comprising the steps of:

setting an upper limit of density values to be displayed in an image and a lower limit of density values to be displayed in the image, the upper limit and the lower limit thereby defining a window of density values to be displayed in the image;

providing in memory a first table having density values within the window of density values as addresses, brightness values to be displayed in color in the image as data for density values in a range of density values between a first threshold value and a second threshold value, and brightness values to be displayed in monochrome in the image as data for density values outside the range of density values between the first threshold value and the second threshold value;

providing in memory a second table having density values within the window of density values as addresses, and brightness values as data, the brightness values including only brightness values to be displayed in monochrome in the image;

extracting pixels having density values falling within the window of density values from the image data;

determining, for each extracted pixel of the extracted pixels, a density gradient of the extracted pixel, the density gradient being determined based on the density value of the extracted pixel and a density value of at least one pixel surrounding the extracted pixel;

comparing, for each extracted pixel of the extracted pixels, the density gradient of the extracted pixel with a third threshold value and a fourth threshold value;

selecting, for each extracted pixel of the extracted pixels, one of the first table and the second table to be used in displaying the extracted pixel based on a result of the comparing step;

displaying the extracted pixels as an image using the one of the first table and the second table selected for each extracted pixel; and changing at least one of the first threshold value and the second threshold value until a desired image region of the displayed image is displayed in color.

6. A method of setting threshold values for extracting a desired image region from image data, the image data including pixels having density values, the method comprising the steps of:

setting an upper limit of density values to be displayed in an image and a lower limit of density values to be displayed in the image, the upper limit and the lower limit thereby defining a window of density values to be displayed in the image;

providing in memory a first table having density values within the window of density values as addresses, brightness values to be displayed in color in the image as data for density values in a range of density values between a first threshold value and a second threshold value, and brightness values to be displayed in monochrome in the image as data for density values outside the range of density values between the first threshold value and the second threshold value;

providing in memory a second table having density values within the window of density values as addresses, and brightness values as data, the brightness values including only brightness values to be displayed in monochrome in the image;

providing in memory a third table having density gradients as addresses, an address specifying one of the first table and the second table as data for density gradients between a third threshold value and a fourth threshold value, and an address specifying a remaining one of the first table and the second table as data for density gradients not between the third threshold value and the fourth threshold value;

extracting pixels having density values falling within the window of density values from the image data;

determining, for each extracted pixel of the extracted pixels, a density gradient of the extracted pixel, the density gradient being determined based on the density value of the extracted pixel and a density value of at least one pixel surrounding the extracted pixel;

selecting, for each extracted pixel of the extracted pixels, one of the first table and the second table to be used in displaying the extracted pixel using the density gradient of the extracted pixel and the third table;

displaying the extracted pixels as an image using the one of the first table and the second table selected for each extracted pixel; and changing at least one of the first threshold value and the second threshold value until a desired image region of the displayed image is displayed in color.

* * * * *